United States Patent [19]

Lampo et al.

[11] Patent Number: 4,744,925

[45] Date of Patent: * May 17, 1988

[54] METHOD FOR PRODUCING MODIFIED ROSIN & ESTER

[75] Inventors: Ciro S. Lampo; William T. Turner, both of De Ridder, La.

[73] Assignee: Westvaco Corporation, New York, N.Y.

[*] Notice: The portion of the term of this patent subsequent to Mar. 17, 2004 has been disclaimed.

[21] Appl. No.: 942,725

[22] Filed: Dec. 17, 1986

Related U.S. Application Data

[63] Continuation-in-part of Ser. No. 732,438, May 9, 1985, Pat. No. 4,650,607.

[51] Int. Cl.$^4$ ................................................ C09F 7/00
[52] U.S. Cl. ..................................... 260/104; 260/102
[58] Field of Search ................................. 260/104, 102

[56] References Cited

U.S. PATENT DOCUMENTS

| | | | |
|---|---|---|---|
| 4,643,348 | 2/1987 | Thomas et al. | 260/104 |
| 4,650,607 | 3/1987 | Lampo et al. | 260/104 |
| 4,657,706 | 4/1987 | Durkee | 260/104 |

*Primary Examiner*—Harold D. Anderson
*Attorney, Agent, or Firm*—Terry B. McDaniel; Richard L. Schmalz

[57] ABSTRACT

The catalytic combination of phosphinic acid (also called hypophosphorous acid) and a phenol sulfide compound is disclosed to accelerate the reaction rate for the esterification of a modified rosin with a polyhydric alcohol, as well as provide product color improvements. According to the process of the invention, a rosin is reacted with up to a 50% equivalent excess of the polyhydric alcohol in the presence of phosphinic acid and a phenol sulfide compound at a temperature of from about 180° C. to about 300° C. The rosin may be treated with a member of the group consisting of a phenol, an aldehyde, a dibasic acid, and a combination thereof.

15 Claims, No Drawings

METHOD FOR PRODUCING MODIFIED ROSIN & ESTER

This is a continuation in part of commonly assigned and co-pending application Ser. No. 732,438, filed May 9, 1985, now U.S. Pat. No. 4,650,607.

BACKGROUND OF THE INVENTION

1. Field of the Invention

This invention relates to an improved method of preparing esters of rosin. In particular, the improvement of this invention lies in reacting rosin and a polyhydric alcohol in the presence of phosphinic acid ($H_3PO_2$) and a phenol sulfide compound, as combined catalyst, to reduce the reaction time for rosin ester formation and to provide a rosin ester of improved color and oxidation stability. More particularly, this invention relates to rosin esters of improved color and oxidation stability wherein the rosin material was treated with a phenol, an aldehyde, a dibasic acid, or a combination thereof.

2. Description of the Prior Art

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin or the rosin acids contained therein as for example, abietic acid, pimaric acid, sapinic acid, etc.

The natural separation and gradual conversion of some of the hydrophilic components of sap and related plant fluids from the cambium layer of a tree into increasingly hydrophobic solids are the generic process of forming diverse gums, resins and waxes. The oleoresin intermediate in this process is typified in pine gum, which flows from hacks on the trunks of southern yellow pine in southeastern United States, in France, and in other countries. Pine gum contains about 80% (gum) rosin and about 20% turpentine.

Resinification from oleoresin can result from either natural evaporation of oil from an extrudate or slow collection in ducts in sapwood and heartwood. Pinus stumps are valuable enough to be harvested, chipped, and extracted with hexane or higher-boiling paraffins to yield wood rosin, wood turpentine, and other terpene-related compounds by fractional distillation. In the kraft, i.e., sulfate, pulping process for making paper, pinewood is digested with alkali producing crude tall oil and crude sulfate turpentine as by-products. Fractionation of the crude tall oil yields tall oil rosin and fatty acids.

The chemical transformation of gum, wood, and tall oil rosin which relates to this invention is esterification. The beneficial product characteristics provided by rosin esterification for various applications have led to the development of many esterification procedures, particularly treatments with polyhydric alcohols. U.S. Pat. Nos. 2,369,125, 2,590,910 and 2,572,086 teach rosin esterification with glycerol and pentaerythritol, among other polyhydric alcohols, usually preceded by a rosin disproportionation step.

U.S. Pat. No. 3,780,012 teaches pretreating tall oil rosin with paraformaldehyde followed by distillation prior to the esterification reaction to achieve product color improvement. U.S. Pat. No. 3,780,013 teaches the incremental addition of a phenol sulfide compound during tall oil rosin pentaerythritol esterification. The color of the product of these procedures was claimed to be an M on the U.S.D.A. scale. The rosin color standards referred to in this invention are U.S.D.A. standards varying from X, the lightest, to D, the darkest color. The scale of colors is designated as X, WW, WG, N, M, K, I, H, G, F, E, and D. Also, due to the light color of the rosin ester products of the invention process, among X color rosins, the designations of X-A, X-B and X-C indicate lighter than X color, with X-C being the lighter color.

U.S. Pat. No. 4,172,070 teaches employing arylsulfonic acid in place of the traditional basic esterification catalysts, such as calcium oxide, to reduce the time for tall oil rosin-pentaerythritol esterification to obtain a rosin ester of improved oxygen stability, color and melting point. This work is confounded, however, by the unusually large amount of pentaerythritol used (35% equivalent excess) which by itself would markedly increase the rate of acid number drop. Products with Ring and Ball melting points of 77° C. to 86.5° C. were obtained. Normal commercial pentaerythritol esters of rosins have Ring and Ball melting between 95° C. and 105° C.

Commonly assigned U.S. Pat. No. 4,548,746 teaches the use of phosphinic acid (also called hypophosphorous acid) as a catalyst in the esterification of rosin with pentaerythritol to produce a rosin ester without appreciable color degradation. Also commonly assigned U.S. Pat. No. 4,650,607 discloses a method for rosin esterification in the presence of phosphinic acid and a phenol sulfide compound, as combined catalyst, to provide an ester of improved color and oxidation stability.

The object of this invention is to provide a novel method of preparing esters of rosin. It is a further object of this invention to employ a catalyst which accelerates the rosin esterification reaction rate to result in a reduced reaction time. It is a still further object of this invention to permit a reduction in the amount of polyhydric alcohol employed in the reaction, resulting in reduced cost and higher, more desirable melting points, i.e., from 95° C. to 105° C. It is a specific object of this invention to provide a method of preparing esters of rosin exhibiting a color equivalent to or lighter than the starting rosin. A further specific object of this invention includes subjecting the rosin material to a treatment with a phenol, an aldehyde, a dibasic acid, or a combination thereof.

SUMMARY OF THE INVENTION

All of the above objects are met in the discovery that phosphinic acid (also called hypophosphorous acid) reacts synergistically with a phenol sulfide compound as a combined catalyst to accelerate the rosin esterification reaction rate. In particular, a rosin or a rosin material treated with a phenol, an aldehyde or a disbasic acid, is reacted with at least an equivalent amount of a polyhydric alcohol, preferably glycerol or pentaerythritol, in the presence of from 0.01% to 2.0% phosphinic acid and 0.05% to 1.0% of a phenol sulfide, based on the weight of the rosin, at a temperature of from about 180° C. to about 300° C. to produce a rosin ester having a color equivalent to or lighter than the starting rosin.

DESCRIPTION OF THE PREFERRED EMBODIMENT

Phosphinic acid is a strong, reducing acid, useful for its antioxidant or color-reducing properties in the preparation of light colored fatty acid taurates (U.S. Pat. No.

3,232,968), carboxylic acid esters with poly(oxyalkylene) compounds (British patent No. 979,673 and U.S. Pat. No. 3,071,604), acrylic and methacrylic esters of glycols (japanese patent No. 73 11084), or in light colored alkyl resins (japanese patent No. 12997). Also, phosphinic acid has been used as a tall oil treatment agent to convert the impurities and color bodies contained therein to a non-distillable form and to promote decarboxylation of rosin acids present (U.S. Pat. No. 2,441,197).

A novel rosin esterification process is now provided involving the use of phosphinic acid in combination with a phenol sulfide compound as the esterification catalyst.

The gum, wood, and tall oil rosin materials to which this invention relates may be subjected to other treatments prior to esterification. For example, in addition to the distillation treatment alluded to in the fractionation extraction processes, the rosin material may have been subjected to disproportionation, hydrogenation, or polymerization, or some combination of these and/or other treatments.

Other treatments of the rosin material include reacting the rosin with a phenol (such as para-cyclohexylphenol, alkyl($C_1$-$C_9$)phenols, phenol, para-phenylphenol, or xylenol), an aldehyde (such as formaldehyde or paraformaldehyde), or a dibasic acid (such as maleic anhydride, maleic acid, or fumaric acid). In an alternative esterification procedure, the rosin material is reacted with a phenol, an aldehyde, a dibasic acid, or a combination thereof simultaneous with a polyhydric alcohol in the presence of phosphinic acid and a phenol sulfide compound.

As polyhydric alcohols, ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol, sorbitol, as well as combinations of the aforementioned and other similar polyhydric alcohols may be used. The amount of the alcohol used in the esterification may be varied widely but generally no more than an approximate 50% excess over the equivalent combining proportion will be necessary.

In general, the esterification is effected by introducing the rosin, up to a 50% equivalent excess of a polyhydric alcohol, preferably 5-20% equivalent excess, and from 0.01% to 2.0% phosphinic acid, and from 0.05% to 1.0% phenol sulfide based on the weight of the rosin, into a reaction vessel. The particular points of addition of the phosphinic acid and phenol sulfide may be separate so long as they are available during the reaction of the primary esterification reactants (i.e., the rosin and the polyhydric alcohol). The reaction temperature is raised to from about 180° C. to about 300° C., preferably from about 250° C. to about 280° C., for up to about 15 hours or until the rosin acid number is reduced to about 15 or below. Longer reaction times may be employed, but the additional time and energy costs generally outweigh any benefits received. The preferred amount of phosphinic acid is from about 0.05% to about 0.5%, based on the weight of the rosin, and no benefit is seen to be derived in employing amounts of 0.5% or more of the phosphinic acid. The preferred amount of phenol sulfide is from about 0.2% to about 0.5%, based on the weight of the rosin.

The phenol sulfide is set forth in U.S. Pat. No. 3,780,013 which is incorporated by reference herein. As stated in the aforementioned patent, the treating agent may be represented by the structure:

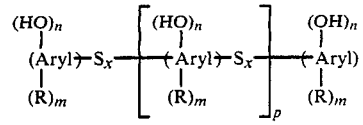

where n is an integer from 1 to 3 inclusive, p is an integer from 0 to 100 and preferably about 5 to 20 inclusive, and the sum of m and n on each aryl is between 1 and 5 inclusive, x is 1, 2, or 3, and R is a hydrocarbon group, e.g., alkyl cycloalkyl and substituted alkyl, e.g., $C_1$-$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms, inclusive, typically phenyl, naphthyl and anthracyl. Typical cycloalkyl groups contain 3-8 carbon atoms in the ring, e.g., cyclopropyl, cyclopentyl and cyclohexyl.

Advantageously, the esterification reaction should be accomplished in the presence of an inert atmosphere, provided by a nitrogen purge on the reaction vessel prior to addition of the reactants and a nitrogen sparge during the reaction. Since light color is a desirable property of the rosin ester and the color is sensitive to oxygen exposure, such exposure must be minimized.

Also, since an advantage of the combined phosphinic acid and phenol sulfide catalyst is minimal color degradation during esterification, the rosin ester color is primarily dependent upon the color of the starting rosin. When rosin is esterified, the combined catalysts of the invention process permit production of an ester of an equivalent or lighter color than the starting rosin.

In a preferred embodiment of the invention process, the rosin starting material is melted in an inert atmosphere in the reaction vessel, followed by the addition of 0.2% (based on the weight of the rosin) of phosphinic acid (50% active in water), 0.5% (based on the weight of the rosin) of a phenol sulfide, and about 15-20% equivalent excess pentaerythritol. A very low inert gas sparge, such as nitrogen or carbon dioxide, is maintained as the mixture is heated to about 250° C. with agitation, which temperature is maintained for about three hours. The reaction temperature then is increased to about 275° C. until the reaction product acid number is decreased to about 40 or below, or for a time of about 2 to 12 hours. After about 5 to 15 hours from initiating the reaction, the inert gas sparge is replaced with a steam sparge, followed by addition of about 0.053% solid sodium hydroxide (or other basic compound), based on the weight of the rosin, to neutralize the phosphinic acid catalyst, and the mixture is cooled to from about 220° C. to about 230° C. and sparged with nitrogen to remove all moisture. (Alternatively, a 50% aqueous sodium hydroxide solution may be used.)

The following examples serve to illustrate the unexpected color improvement in rosin esters made by the invention process, as well as the reduced reaction time. Unless otherwise specified, the parts are by weight.

EXAMPLE 1

In a suitable reaction vessel 500 parts of a tall oil rosin with a U.S.D.A. color of WW was melted at 200° C.

with a nitrogen blanket. Pentaerythritol in the amount of 65 parts was added slowly at 200° C. This mixture, in the absence of an esterification catalyst, was heated to 250° C. for three hours with agitation, after which the temperature was increased to 275° C. and held until the reaction product acid number was 15. The total reaction time was 43 hours and the final ester had a U.S.D.A. color of I.

EXAMPLE 2

This and the following example show the benefits from employing a traditional rosin esterification catalyst in the reaction. The reaction was carried out as in Example 1 except, prior to the pentaerythritol addition, 1.076 parts of calcium formate were added as catalyst at 200° C. The reaction time at 275° C. required to achieve a reaction product acid number of 15 was only 6½ hours for a total reaction time of 9½ hours. Also, the final ester had a U.S.D.A. color from M to K and a Ring and Ball melting point of 100° C.

EXAMPLE 3

The reaction was carried out as in Example 2 except 1 part of calcium hydroxide was added as catalyst in place of calcium formate. The total reaction time required to achieve an acid number of 15 was 10 hours. The final ester had a U.S.D.A. color of I.

Thus, the catalysts of Examples 2 and 3 provide reduced reaction time, but no real benefits in product color are achieved.

EXAMPLE 4

To determine the benefits received from employing an arylsulfonic acid as a catalyst for the rosin esterification (as taught by U.S. Pat. No. 4,172,070), the reaction was carried out as in Example 1 except that after the pentaerythritol was added to the melted rosin and mixed well at 200° C., 1 part of paratoluenesulfonic acid was added. The time required to achieve an acid number of 15 or less was twelve hours. The final ester had a U.S.D.A. color of WW to WG. While the reaction time was reduced over no catalyst and product color was better than that provided with the catalysts of Examples 2 and 3, little or no color reduction (lightening) from the starting rosin was noted.

EXAMPLE 5

To determine whether an advantage is achieved by a catalyst combination of an arylsulfonic acid and a phenol sulfide, the reaction was carried out as in Example 4 except, after addition of the paratoluenesulfonic acid, phenol sulfide (Vultac ®2, an amyl phenol sulfide polymer sold by Pennwalt) was added incrementally in amounts of 0.5 parts each at the beginning of the reaction, four hours later at 275° C. and, finally, four hours later at 275° C. The total reaction time required to achieve an acid number below 15 was 10 hours, and the final ester had a U.S.D.A. color of X to WW. Thus, no significant improvement was noted over either of the catalysts used alone.

EXAMPLE 6

To show the synergistic catalytic and product color improvement effect of the combination of phenol sulfide and phosphinic acid in rosin esterification, the reaction was carried out as in Example 5 except, in place of the paratoluenesulfonic acid, 1 part of 50% active phosphinic acid was added. Also, rather than incremental addition, all the phenol sulfide (1.5 parts) was added with the other reactants at the beginning of the reaction. After reaction for three hours at 250° C., the temperature was increased to 275° C. for four hours to produce a final ester having an acid number below 13 and a U.S.D.A. color of X-B to X-C.

EXAMPLE 7

To show the benefit of the invention process for gum rosin esterification, the reaction was carried out as in Example 6 except that gum rosin with a U.S.D.A. color of WG was employed as the starting rosin material. The final ester had an acid number of 11 and a U.S.D.A. color of X-A to X-B.

EXAMPLE 8

In a suitable reaction vessel 500 parts of a Chinese gum rosin with a U.S.D.A. color of X-WW was melted at a temperature of 190° C. with a nitrogen blanket. To the melted rosin was added 1.25 parts phenol sulfide, followed by slow addition of 70 parts glycerine. The reaction temperature was raised to 204.4° C., and 65 parts fumaric acid was added slowly. The temperature was raised to 250° C. and held for about 3 hours. Next, 1.25 parts hypophosphorous acid was added slowly (as a 50% active solution). The reaction was continued at 250° C. for an additional 20.75 hours, after which the reaction product was steam sparged for 1 hour. The final product exhibited a color WW and an acid number of 36.2.

EXAMPLE 9

In a suitable reaction vessel 400 parts of a wood rosin with a U.S.D.A. color of WG was melted at 160° C. with a nitrogen cover. One part phenol sulfide was added with agitation. Maleic anhydride was added slowly (piecemeal) as a solid, after which the temperature was raised slowly to 200° C. and 59.16 parts pentaerythritol was added. Upon pentaerythritol addition, the temperature was raised slowly to 250° C., and 1 part hypophosphorous acid was added (as a 50% active solution). The reaction was continued until the product acid number was 16.3 (24 hours). The rosin ester product had a color of X-A.

EXAMPLE 10

To show the synergism achieved with phenol sulfide and hypophosphorous acid combined catalyst over the phenol sulfide used above, two esterification reactions were conducted by separately melting 300 parts each tall oil rosin of a U.S.D.A. color of WG at 190° C. under a nitrogen cover. The molten rosin was cooled to 150° C. and 6 parts each paraformaldehyde was added slowly (to prevent foaming). Each rosin-paraformaldehyde reaction was raised to 177° C. and permitted to continue for about 1.25 hours. The reaction temperature of each reaction then was raised to about 195° C. In each case, 0.75 parts phenol sulfide (crystals) was added. In only one reaction, phenol sulfide addition was followed by addition of 0.75 parts hypophosphorous acid (as 50% active aqueous solution). Catalyst addition was followed by separate slow addition of 42 parts pentaerythritol. Reaction temperature was raised to 230° C. and held for 2 hours, after which time it was raised to 260° C. and held for 2 hours. The modified rosin ester product was cooled to 220° C. and removed. Final product color for the product made using phenol sulfide alone was WW; whereas, the color for the product made using the combined catalyst system was X-A.

EXAMPLE 11

Similar pentaerythritol esterifications of tall oil rosin (color of U.S.D.A. WG) were conducted under the same reaction conditions as in Example 10, except that the paraformaldehyde was replaced by 22.5 parts butyl phenol (followed by addition of 0.62 parts magnesium oxide) and only 30 parts pentaerythritol was employed. The color of the final modified rosin ester made with phenol sulfide alone was U.S.D.A. X; whereas, the final color of the product made using the combined catalyst was U.S.D.A. X-B to X-C.

Clearly, the marked improvement in the reaction time required to achieve the desired product acid number and the marked improvement (i.e., lightening) of product color using the catalyst combination of this invention exhibit an unexpected and unobvious synergistic catalytic effect for rosin esterification.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for producing a modified rosin ester which comprises heating rosin and polyhydric alcohol in the presence of a catalytic amount of phosphinic acid and a phenol sulfide compound in an inert environment wherein the rosin is reacted with an effective modifying amount of a compound selected from the group consisting of a phenol, an aldehyde, a dicarboxylic acid, and a combination thereof.

2. The process of claim 1 conducted in an inert environment for from 5 to 15 hours at from 180° C. to 300° C. in the presence of 0.01% to 2.0% phosphinic acid and 0.05% to 1.0% of a phenol sulfide compound, followed by a steam sparge and addition of a basic compound in an amount sufficient to neutralize the phosphinic acid.

3. The process of claim 1 wherein the rosin is esterified with up to 50% excess equivalent of the polyhydric alcohol at from 250° C. to 280° C.

4. The process of claim 1, 2, or 3 wherein the rosin is selected from the group consisting of tall oil rosin, gum rosin and wood rosin.

5. The process of claim 1, 2 or 3 wherein the polyhydric alcohol is pentaerythritol in an amount of 5–20% equivalent excess, based on the rosin.

6. A process for esterifying rosin with a polyhydric alcohol wherein the rosin is modified by reaction with an effective modifying amount of a compound selected from the group consisting of a phenol, an aldehyde, a dicarboxylic acid, and a combination thereof in an inert environment in the presence of from 0.01% to 2.0% phosphinic acid and from 0.05% to 1.0% of a phenol sulfide compound, based on the weight of the rosin, at a temperature of from about 180° C. to about 300° C. for a time required to achieve an ester product acid number of 15 or below and neutralizing the phosphinic acid.

7. The process of claim 6 wherein the modified rosin is esterified with up to 50% excess equivalent of pentaerythritol in the presence of from 0.2% to 0.5% phosphinic acid and 0.2% to 0.5% of a phenol sulfide compound and the reaction is conducted under an inert gas sparge.

8. The process of claim 6 wherein the esterification is conducted at a temperature of from 250° C. to 280° C.

9. The process of claim 7 wherein the inert gas is selected from the group consisting of carbon dioxide and nitrogen.

10. The process of claim 6, 7, or 8 wherein the rosin is selected from the group consisting of tall oil rosin, gum rosin, and wood rosin.

11. The process of claim 6, 7, or 8 wherein the polyhydric alcohol is pentaerythritol in an amount of 5–20% equivalent excess.

12. In a process for effecting rosin esterification which comprises reacting rosin with up to 50% equivalent excess of a polyhydric alcohol, based on the equivalent weight of the rosin, at a temperature ranging from 180° C. to 300° C., the improvement of reacting the rosin with an effective modifying amount of a compound selected from the group consisting of a phenol, an aldehyde, a dicarboxylic acid, and a combination thereof for a time required to achieve an ester product acid number of 40 or below in the presence of from 0.01% to 2.0% phosphinic acid and from 0.05% to 1.0% of a phenol sulfide compound of the structure:

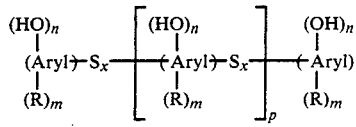

where n is an integer from 1 to 3, p is an integer from 0 to 100, x is 1 to 3, the sum of m and n on each aryl is from 1 to 5, aryl is selected from the group consisting of phenyl, naphthyl, and anthracyl, and R is a hydrocarbon radical of 1 to 22 carbon atoms.

13. The process of claim 12 wherein the rosin is selected from the group consisting of tall oil rosin, gum rosin, and wood rosin.

14. The process of claim 12 wherein the polyhydric alcohol is pentaerythritol in an amount of 5–20% excess equivalent.

15. The process of claim 12, 13, or 14 wherein the time required to achieve an ester product acid number of 40 or below is from 5 to 25 hours.

* * * * *